United States Patent
Engdahl

[11] Patent Number: 5,819,555
[45] Date of Patent: Oct. 13, 1998

[54] REMOVAL OF CARBON DIOXIDE FROM A FEED STREAM BY CARBON DIOXIDE SOLIDS SEPARATION

[76] Inventor: Gerald Engdahl, 1425 Oxford La., Wheaton, Ill. 60187

[21] Appl. No.: 689,931

[22] Filed: Aug. 19, 1996

Related U.S. Application Data

[60] Provisional application No. 60/003,412 Sep. 8, 1995.

[51] Int. Cl.[6] ............................................. F25J 3/00
[52] U.S. Cl. ........................ 62/637; 62/928; 62/929
[58] Field of Search .............................. 62/637, 928, 929

[56] References Cited

U.S. PATENT DOCUMENTS

| | | | |
|---|---|---|---|
| 3,349,020 | 10/1967 | Crownover et al. | 62/637 X |
| 3,376,709 | 4/1968 | Dickey et al. | 62/637 |
| 3,398,077 | 8/1968 | Crownover et al. | 62/637 X |
| 3,398,544 | 8/1968 | Crownover | 62/637 |
| 3,724,225 | 4/1973 | Mancini | 62/637 |
| 4,001,116 | 1/1977 | Selcukoglu | 62/637 X |
| 4,246,015 | 1/1981 | Styring, Jr. . | |
| 4,281,518 | 8/1981 | Muller et al. | 62/637 X |
| 4,533,372 | 8/1985 | Valencia et al. | 62/929 X |
| 4,609,388 | 9/1986 | Alder et al. | 62/637 X |
| 4,923,493 | 5/1990 | Valencia et al. . | |
| 5,062,270 | 11/1991 | Haut et al. | 62/929 X |
| 5,120,338 | 6/1992 | Potts, Jr. et al. | 62/929 X |

FOREIGN PATENT DOCUMENTS 564428  11/1932  Germany ................................. 62/637

*Primary Examiner*—Christopher B. Kilner

[57] ABSTRACT

A process with few parts is provided to remove carbon dioxide from a feed stream. The solid forming property of carbon dioxide and the low vapor phase solubility of carbon dioxide at cold temperatures form the basis for the separation process. The cooled feed stream enters a separation vessel where process means are provided to produce and separate carbon dioxide solids. Carbon dioxide is removed from the vessel as a carbon dioxide rich liquid stream. Purified cold vapor is removed from the separation vessel as a product stream.

7 Claims, 3 Drawing Sheets

REMOVAL OF CARBON DIOXIDE FROM A FEED STREAM BY CARBON DIOXIDE SOLIDS SEPARATION

This is a continuation of Provisional application Ser. No. 60/003,412, filed Sep. 8, 1995, and now abandoned.

FIELD OF THE INVENTION

This invention relates to low temperature and cryogenic separation of carbon dioxide from a feed stream. The invention utilizes the solid forming property of carbon dioxide and the process means of forming and removing the carbon dioxide from the feed stream.

BACKGROUND OF THE INVENTION

Most natural gas, as it comes from underground reservoirs contains carbon dioxide, hydrogen sulfide, mercaptans, and other sulfur compounds. These compounds can be detrimental in the utilization of the natural gas. Carbon dioxide can be present in large quantities and acts as a diluent and reduces the heating value of the gas. It is desirable to lower the carbon dioxide content of the natural gas to about one or two mole percent before the gas is transported long distances via pipeline or utilized for many other applications. Carbon dioxide and some of the additional above compounds when cooled can form solids which plug processing equipment. Carbon dioxide is removed from natural gas for applications including petrochemical plants, liquified natural gas(LNG) plants, nitrogen rejection units, natural gas pipelines, natural gas liquid plants, and enhanced oil recovery applications. The invention would generally be used in applications where natural gas is the feed stream. A natural gas feed stream is used as the basis for the patent description and example. However, the invention can also be used for the separation of carbon dioxide from other streams such as the removal of carbon dioxide from a mixture of mainly ethane and carbon dioxide and the separation of carbon dioxide from land fill gas.

Current processes for removing carbon dioxide and other compounds from feed streams involve systems with considerable equipment and are a significant capital investment. These processes can be categorized as those which generally operate at near ambient temperatures and warmer and those that operate at cryogenic temperatures. The separation processes which operate at the warmer temperatures include absorption by physical solvents, absorption by chemical solvents and adsorption by solids. The processes that operate at the colder temperatures include distillation, physical absorption, and the cryogenic processes that separate the carbon dioxide by forming solid carbon dioxide particles.

Conventional cryogenic distillation systems used for removing carbon dioxide are limited by the purity which can be obtained in the product stream. The distillation column needs to operate at conditions where solid carbon dioxide will not form. This operation results in outlet stream carbon dioxide contents which are unacceptable for most end use applications. Additives are added to the distillation process to improve the product stream purity. The addition of additives results in additional distillation processes being provided for the separation of the additives. The cryogenic physical absorption process utilizes a circulating solvent such as methanol to remove the carbon dioxide from the feed stream. Additional separation means are required to reuse the solvent.

Several cryogenic separation means utilize the formation of solids to separate carbon dioxide and other constituents from the feed stream. These include separating solids from a liquid product, separating solids from a vapor stream and the use of distillation and a controlled freezing zone.

The cryogenic separation of solids from a liquid product is disclosed by Selcukoglu in U.S. Pat. No. 4,001,116. In this process the carbon dioxide solids are formed in liquid LNG. A stream containing carbon dioxide solids and liquid is removed from the vessel by gravitational separation and the clarified liquid LNG stream is the product. The liquid product of this process contains carbon dioxide at its solubility limit. Changes to the liquid product, such as composition changes due to heat leak, will cause the formation of solid carbon dioxide particles within the liquid product. Another example is a system by Styring in U.S. Pat. No. 4,246,015 where liquid ethane and carbon dioxide are cooled to form a carbon dioxide slurry. The slurry is washed with a hydrocarbon solvent. This system has limited application and requires the solvent to be separated from the ethane by distillation for solvent reuse. Other processes where the solid carbon dioxide is separated from the liquid product is described by Kurata et al. in U.S. Pat. No. 2,900,797, and Tung in U.S. Pat. No. 2,996,891. In U.S. Pat. No. 2,901,326 by Kurata et al solid hydrogen sulfide particles are separated from a liquid product stream in a centrifugal or cyclone separator. Systems which separate solid carbon dioxide particles from a liquid which is the product have the added energy and expense of liquefying the feed stream. Feed streams with high carbon dioxide contents could also have exchanger freeze up problems at the cold temperatures required for liquefaction.

Separation of solid particles in a vapor stream is shown by Muller et al in U.S. Pat. No. 4,281,518. Solid particles are produced by contacting a vapor stream with a sprayed liquid stream in a separation tank. In this process the feed stream with air is directed into a separation tank where it is cooled by a liquid nitrogen spray and solid flakes form in a freezing zone. The solid flakes are rotated by a spinning rotor to the tank wall. The air is removed from the tank and the flakes melted. This system would not be appropriate for the separation of carbon dioxide from natural gas. Tafreski, in U.S. Pat. No. 3,203,192 presents a process where solid particles are formed in a separator and removed from a product vapor stream. The solids are removed from the separator and mixed with a circulating vapor stream containing the melted solids. A compressor is used to recirculate the vapor stream. The solids from the separator are mixed with the circulating vapor stream to produce a flowing mixture. However, the formed solids would not flow from the lower portion of the separator unless they were mixed with a substantial liquid stream. The liquid stream would be vaporized and leave with the vaporized solids in the contaminated stream. This would result in a much reduced purified product flow with a large portion of the inlet stream now being part of the leaving contaminated stream. The process does not address the heat and mass transfer requirements of forming the solids. The use of the compressor increases the capital and maintenance expense of the system and reduces the efficiency of the system. Schlumberger et al in U.S. Pat. No. 3,224,208 provides a process with considerable equipment to provide the cryogenic separation of hydrogen sulfide from natural gas.

Valencia et al teaches in U.S. Pat. No. 4,533,372 the separation of carbon dioxide from methane containing gases by treating the gas in at least one distillation zone and a controlled freezing zone. This process contains a freezing zone and the elements of a complete distillation system including a reboiler, a condenser and a reflux stream. The freezing zone vapor feed stream produced in the lower distillation section rises in the freezing zone and is contacted with a sprayed freezing zone liquid feed stream in the freezing zone. The liquid produced from the melted solids is returned to the lower distillation zone. Improvement patent by Valencia et al in U.S. Pat. No. 4,923,493 includes additional apparatus for conditioning the freezing zone liquid feed stream to prevent carbon dioxide solidification of this stream. Carbon dioxide solidification would prevent the use of freezing zone liquid feed stream spray nozzles. An additional improvement patent by Haut et al U.S. Pat. No. 5,062,270 teaches the method and apparatus to start-up the controlled freezing zone process and purify the product stream. This patent provides apparatus for the start-up of U.S. Pat. No. 4,533,372. U.S. Pat. No. 4,533,372 and improvement patents requires the cost and operation expenses of distillation and other equipment. Additional equipment is required for the start up and operation of the complex system. Additional energy is required to operate the distillation equipment.

Barry in U.S. Pat. No. 2,528,028 describes a process for removing water and hydrocarbon liquids from well head natural gas by providing a cool zone in a separator. Water is removed as a solid or as a hydrate. The process has several operational concerns in providing the separation. High pressure well head natural gas will generally form hydrates if expanded to a lower pressure and temperature. Hydrates could form in the expansion device and may plug the device. The operation is also restricted by the formation of hydrates when high pressure natural gas is cooled even without expansion. Hydrates can form in high pressure natural gas at temperatures as warm as 70 degrees F. The hydrates would easily plug and foul the heat exchanger device. Sustained process operating temperatures colder than 33 degrees F. would not be possible without the use of an additive solvent or other drying means. The operation of the process is restricted by problems that the process is designed to prevent. The system is restricted to separating liquids and water from a high pressure gas stream flowing from a high pressure well. The apparatus presented does not provide cryogenic carbon dioxide removal means. Also, it does not include the cooling and heat and mass transfer provisions which are required for forming carbon dioxide solids.

SUMMARY

The need exists for this invention. The objectives of this invention are as follows:

a. To provide a process with few parts for the removal of carbon dioxide from a feed stream.

b. To utilize the production of solids for the effective removal of the carbon dioxide.

c. To provide for the effective and efficient formation of these solids.

d. To provide for the removal of the formed solids using new energy efficient means.

e. To provide a process where the purified product is a vapor.

f. To provide a process where the product purity can be controlled.

g. To provide the separation without the use of distillation and the expense, energy use, and complication of a cryogenic distillation system.

h. To provide for the separation without the use of an additive.

i. To provide a process which can achieve start-up without the investment of additional separation apparatus.

j. To have the ability to provide the carbon dioxide separation at a wide range of pressures from vacuum conditions to pressures approaching the critical pressure of the feed composition.

k. To remove carbon dioxide from natural gas and other feed streams.

The present invention provides a process for separating carbon dioxide from a variety of feed streams utilizing the solids forming property of carbon dioxide for the separation. The feed stream enters the solids formation zone where cooling and heat and mass transfer are provided to form carbon dioxide solids while the stream is contained in the formation zone. The stream is directed to the vapor disengaging zone. Vapor is withdrawn from the vapor disengaging zone as the product stream. Solids and liquids are collected in the removal zone. Several means are provided for the energy efficient removal of carbon dioxide from the vessel. The addition of regulated heat provides for the direct removal of a carbon dioxide rich liquid stream. A fluid stream containing carbon dioxide can also be removed from the vessel. The purity of the product vapor stream is determined by the temperatures maintained in the upper portion of the separation vessel. The quantity of carbon dioxide which can be maintained in the stream as a vapor decreases as the temperature is decreased. Colder operation of the separation vessel provides a product with less carbon dioxide. If the vessel pressure is decreased, the temperature can also be lowered which results in a higher purity product(less carbon dioxide in the product). This invention provides a carbon dioxide separation process without the use of an additive or distillation column. Additional apparatus is not required for start-up. The process can operate within a wide range of pressure conditions.

DESCRIPTION OF THE PREFERRED EMBODIMENT

Figure 1:
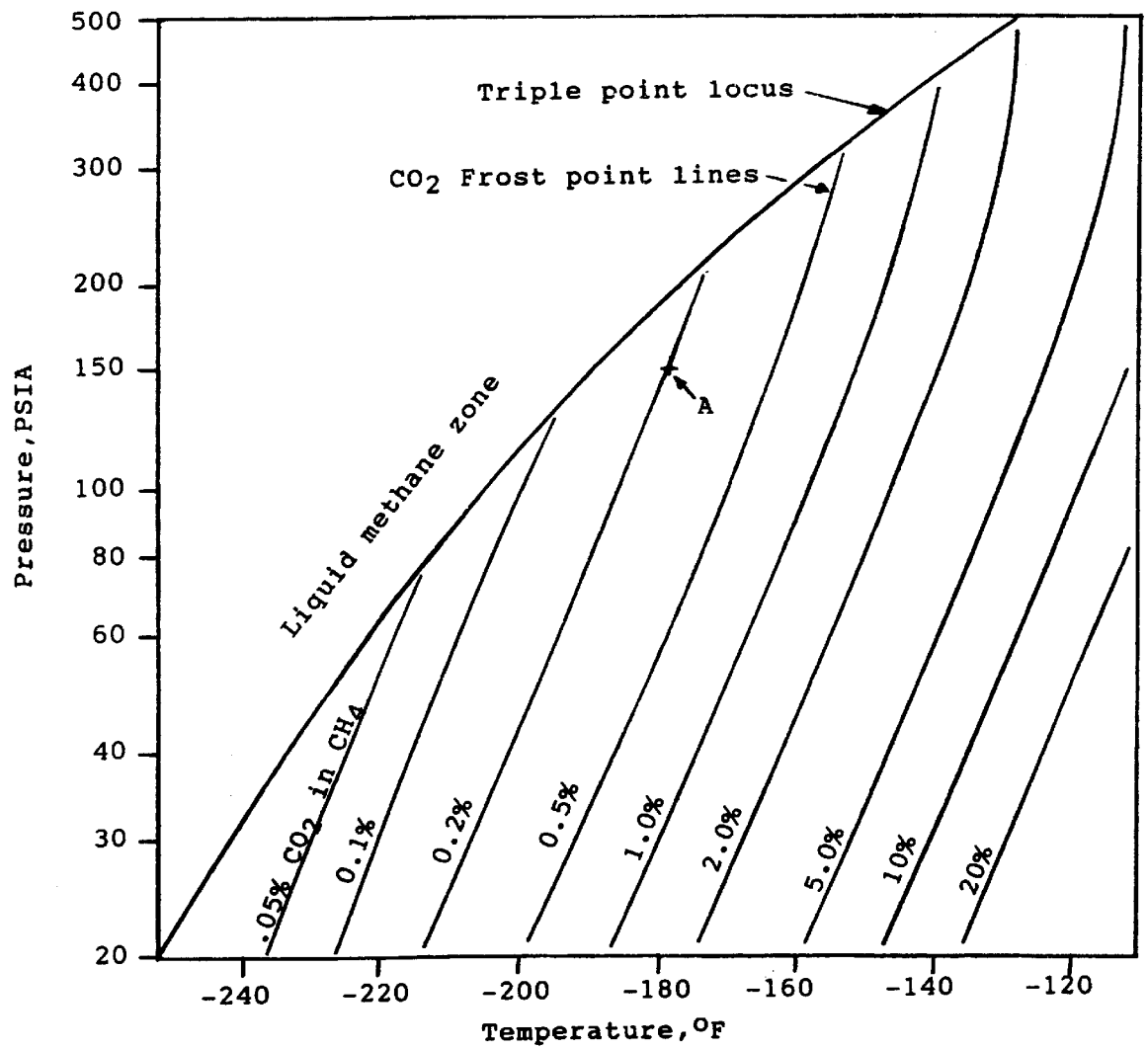
FIG. 1 is a diagram of the solid-liquid-vapor locus of the methane-carbon dioxide system.

This invention utilizes the solid forming property of carbon dioxide in the separation process. This is illustrated in FIG. 1 which shows a portion of the phase diagram for a carbon dioxide and methane binary mixture. This diagram is based on data from Davis, Rodewald, and Kurata, A.I.Ch.E. Journal, September 1962. Point A on FIG. 1 is within the vapor-solid region of the methane and carbon dioxide mixture and shows that a methane and carbon dioxide mixture at a temperature of −180 degrees F. and a pressure of 150 psia would contain vapor with a maximum of about 0.2 mole % carbon dioxide while the methane content would be about 99.8 mole %. If the mixture had contained carbon dioxide levels higher than 0.2% carbon dioxide, the excess carbon dioxide would form a solid. The resultant vapor would contain only 0.2% carbon dioxide. From the diagram a vapor mixture at 100 psia and −200 degrees F. would contain 99.9% methane. The present invention is designed to utilize a vapor phase separation to obtain the purity of the product vapor. The vapor phase is defined by pressure and temperature conditions located to the right of the triple point locus line on FIG. 1. The feed stream can be cooled by the use of direct contact liquid as long as the desired resultant vapor phase operating condition for separation is obtained. In the subject invention the pressure and temperature conditions determine the purity of the product vapor leaving the separation process. As seen from the diagram, colder temperatures can produce a higher purity product. This process can also separate other components of the feed stream if the conditions are such that the component would form solids or be removed in the liquid phase.

Figure 2:
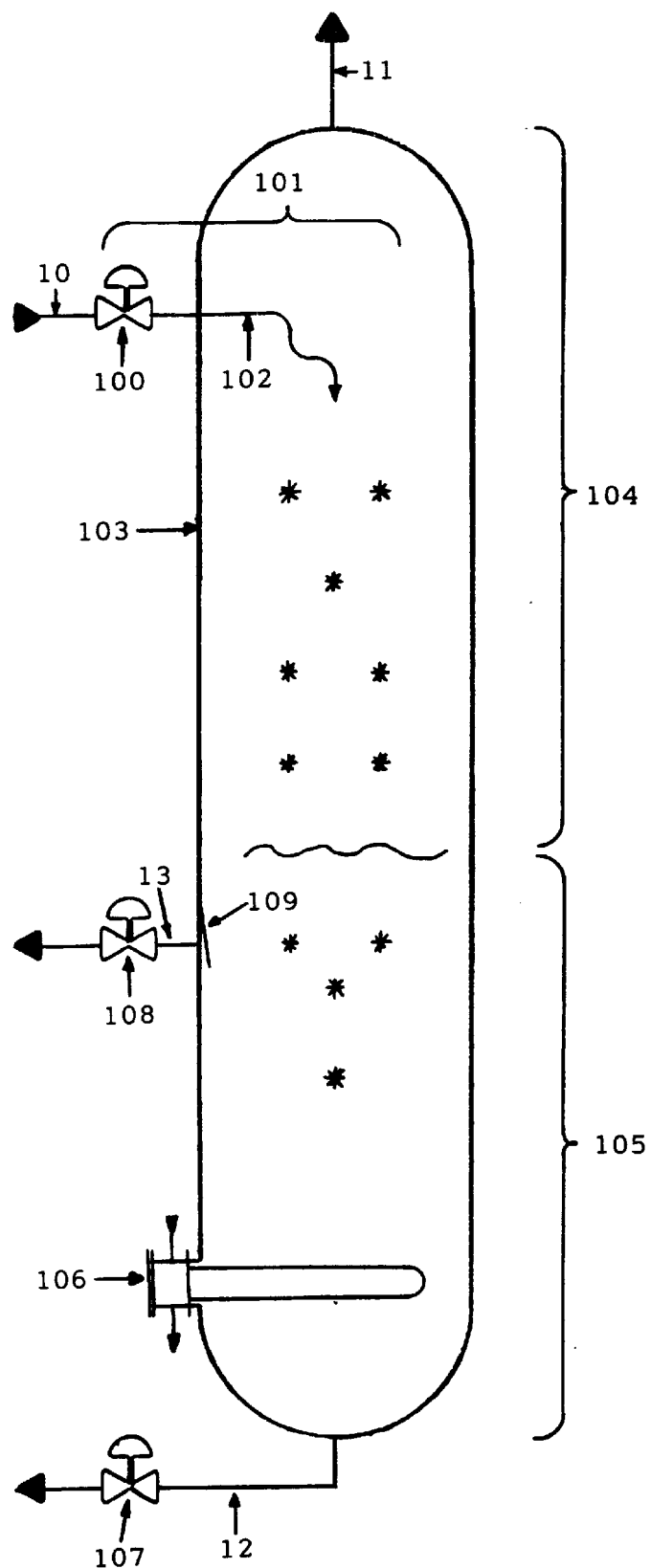
FIG. 2 is a schematic diagram of the present invention.
Figure 3:
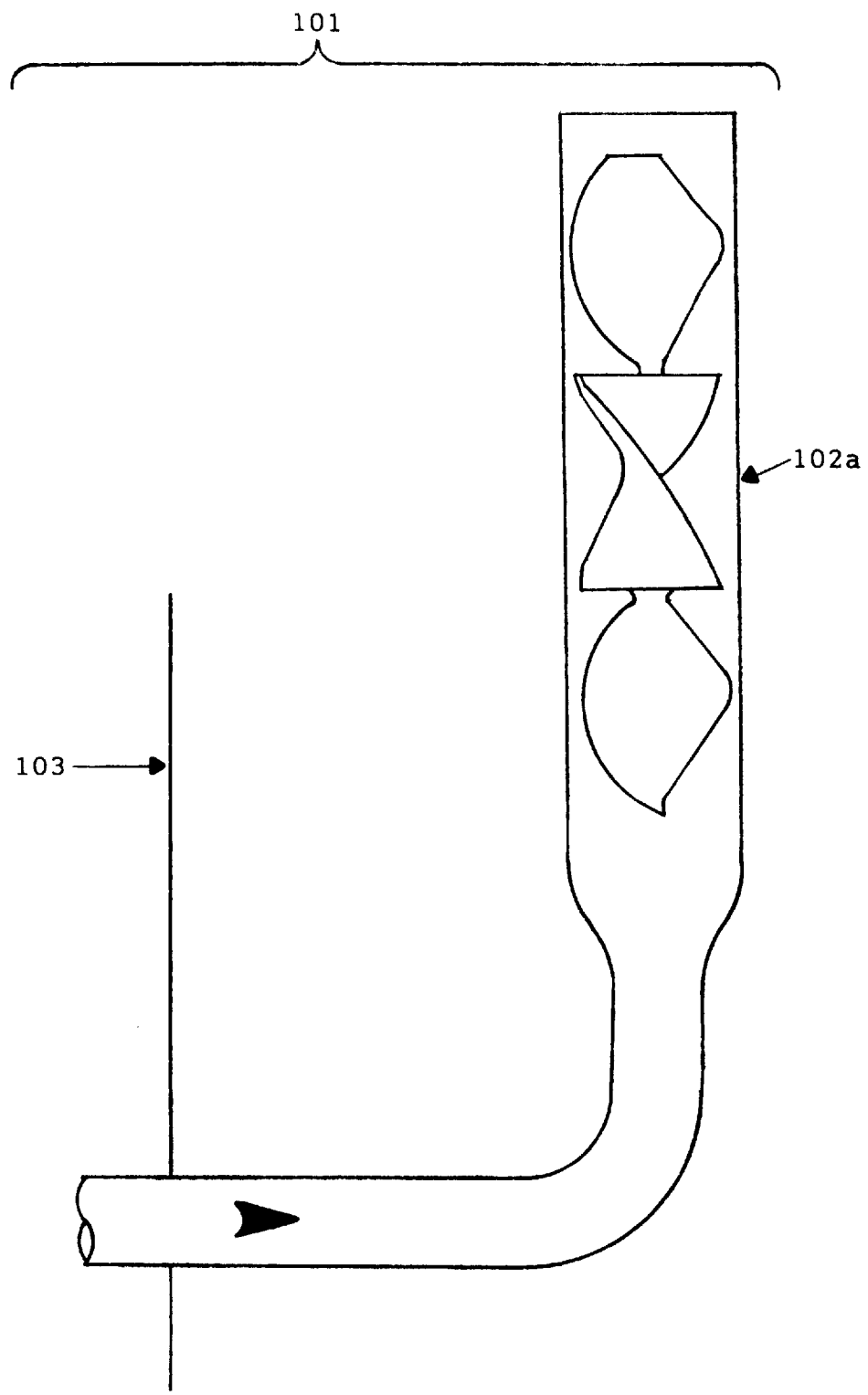
FIG. 3 shows another type of confined stream device within the solid formation zone.

A schematic illustrating the process for the separation of carbon dioxide from a feed stream is shown in FIG. 2. A dried and precooled feed stream enters the system through line 10. The feed stream can be dried by an adsorption system or other systems including a methanol injection system. Cooling conditions need to be such that carbon dioxide plugging of upstream lines and equipment is avoided. The stream is expanded through valve 100 into the solids formation zone 101 where solids are formed in the presence of liquid. The formation zone provides contact surface area between liquid, vapor, and solids and provides cooling for the formation of these solids. The solids formation zone is utilized to provide cooling and area for the formation of solids while the stream is within the confines of the formation zone. Several different confined stream devices can be provided in the formation zone to provide the area and cooling for the effective production of solids. The area required in the solids formation zone is determined by feed stream conditions and conditions in separation vessel 103. The heat of fusion must be removed to form solids. The requirements for cooling and the area required for heat and mass transfer increase as the quantity of carbon dioxide and other components to be removed increases. Configuration 102 illustrates one device for providing area and consists of pipe and one or more smooth bore elbows arranged in series to provide contact area by changing the flow direction and continuously interchanging fluid elements. Configuration 102 is arranged to provide mixing and contact area to produce solids without plugging with solids. Configuration 102 provides heat and mass transfer area for solids formation while the fluid phases are in intimate contact with each other. An alternate device for forming solids would utilize the sparging of the feed stream into liquid in vessel 103. Another device contacts an additional liquid stream with the confined feed stream in formation zone 101 to achieve the required cooling and area for solids formation. The contacting device could be similar to a pipeline static mixer. FIG. 3 shows the static mixer as component 102a within solids formation zone 101. Pressure and temperature conditions are maintained in separation vessel 103 to obtain the carbon dioxide separation as illustrated in FIG. 1.

The cooled stream exits formation zone 101 and enters vapor disengaging zone 104 within separation vessel 103. The stream leaving formation zone 101 contains vapor, solids, condensed higher molecular weight hydrocarbons, and can contain other components such as hydrogen sulfide. The vapor disengaging zone utilizes gravitational separation means to remove solids and liquids from the stream and produce the purified product vapor stream which exits the upper part of vessel 103 via line 11. Solids containing carbon dioxide and liquids are collected in removal zone 105.

The upper part of removal zone 105 contains liquid which is maintained at a temperature colder than the melting temperature of the solid particles. The more dense solid carbon dioxide particles fall toward the bottom of zone 105. Heat is added to the lower part of zone 105 by indirect heater 106 to melt the falling carbon dioxide solids. The lower part of zone 105 contains liquid with a high concentration of carbon dioxide. Carbon dioxide rich liquid is removed from vessel 103 via line 12. Valve 107 is used to throttle the flow in line 12 to maintain the high concentration of liquid carbon dioxide in the lower part of zone 105. The higher density of the solid carbon dioxide particles is utilized to obtain a simple carbon dioxide separation in removal zone 105. Solid carbon dioxide enters the upper part of zone 105 and leaves as a carbon dioxide rich liquid from the lower part of zone 105. Melting the carbon dioxide solids within vessel 103 requires the pressure in the melting region to be higher than the triple point pressure of carbon dioxide which is about 75 psia. Melting carbon dioxide solids at pressures below the triple point pressure would produce vapor. Other carbon dioxide removal systems would be required for operation below the triple point pressure. Several alternate carbon dioxide removal systems are described subsequently.

One system includes the removal of solid carbon dioxide particles from zone 105. The solids are removed in a circulating fluid where the fluid leaving zone 105 contains a carbon dioxide slurry. The slurry stream is introduced to an external separator. The external separator can operate at a pressure higher than the triple point pressure and discharge a carbon dioxide rich liquid stream or operate at a pressure lower than the triple point pressure and discharge a carbon dioxide rich vapor stream. The fluid then returns to zone 105. In another system solid carbon dioxide particles are accumulated within a fluid in the bottom of zone 105 and then are removed with the fluid from the vessel. In another system a warmed circulating fluid is utilized to melt carbon dioxide solids within zone 105. In another system the carbon dioxide solids are accumulated in zone 105 as the process operates in a batch mode. The batch mode of operation can utilize one or more vessels. In the batch mode of operation the vessel with the accumulated solids is isolated and the carbon dioxide is removed from the isolated vessel. In another system the upper part of vessel 103 is operated at a pressure lower than the triple point pressure of the carbon dioxide. The static head pressure of removal zone 105 fluid is utilized to provide a pressure in the carbon dioxide melting area which is above the triple point pressure of the carbon dioxide. The melted carbon dioxide would be in the liquid state.

Hydrocarbon liquids and other liquids will collect in zone 105. These liquids can be removed via line 13. The flow in line 13 is controlled by valve 108. A deflection baffle plate 109 can be provided in vessel 103 to reduce the quantity of carbon dioxide solids leaving via line 13. Lines 12 and 13 provide means for removing carbon dioxide rich liquid and other liquids from zone 105 as two separate streams without distillation or other separation means. Other solids formed in addition to carbon dioxide solids are also melted and removed in zone 105. The temperature of zone 105 in the region of line 13 can be regulated to affect the composition of the liquid leaving via line 13. The temperature can be warmed, but would be colder than the melting point of the solid particles. Warmer temperatures would result in liquid compositions containing less of the volatile components. The heat would be through indirect means and preferably around the circumference of the vessel such that it does not melt the falling carbon dioxide particles. The heater may be external to the vessel.

There will be a temperature gradient in separation vessel 103 between the colder upper portion of the vessel and the warmer temperature near the bottom of the vessel. The lower part of the vessel would be operating at a temperature warmer than the melting point of the carbon dioxide solids which would be about −70 degrees F. Increased vessel lengths with smaller diameters would result in less convection and conduction heat transfer within the vessel and present higher energy efficiencies. The vessel needs to be sized as a separator. The vapor disengaging zone is sized as a separator, allowing the solids and liquids to fall within a rising vapor stream. Vessel 103 is also designed to prevent the build up of solids within the vessel. A solids buildup would hinder the separation process. If required, heat tracing or other means can be provided such that proper separation performance can be obtained.

The warm feed stream can be used as the source of heat in exchanger 106. The feed stream can be cooled to temperatures approaching the melting point temperature of the carbon dioxide and provides higher process energy efficiencies compared to processes which add heat at warmer temperatures.

The cold product vapor stream leaving the separation vessel via line 11 can be processed by:

a. Utilizing the cold vapor to cool the incoming feed stream in a heat exchanger.

b. Warming in a heat exchanger and compressing it to a higher pressure. The stream is then cooled in the same exchanger in heat exchange with the incoming low pressure stream. The higher pressure cold stream can be condensed or routed to a dephlegmator.

c. Joining with another vapor stream with a reduced carbon dioxide content. The combined stream can be liquefied or further processed. The reduced carbon dioxide content vapor stream can be a boil off or flash stream from a vessel or storage tank.

d. Flowing to a condenser or partial condenser where part of the liquid condensate is refluxed to the condenser inlet. The condensate reflux is mixed with the incoming product stream to reduce the carbon dioxide content in the stream such that it can be condensed without carbon dioxide solidification.

e. Directing the stream to an additional carbon dioxide separation vessel operating at a lower pressure for additional carbon dioxide removal.

f. Further treatment with a warm or cold molecular sieve system.

EXAMPLE

The feed is a dried gas stream at 750 psia and contains about 80% methane, 5% carbon dioxide, and the remainder nitrogen and other hydrocarbons. The feed is precooled and enters via line 10 at about −105 degrees F. At this pressure and temperature condition the carbon dioxide component of the mixture within line 10 is soluble. The separation vessel 103 operates at a pressure of about 400 psia. The feed stream is expanded through valve 100 into solids formation zone 101. The stream exits configuration 102 at a temperature of about −140 degrees F and enters vapor disengaging zone 104. Solid particles containing carbon dioxide and hydrocarbon liquids are collected in removal zone 105. The vapor rises in disengaging zone 104 and exits vessel 103 via line 11. The product in line 11 contains about 1.1% carbon dioxide which meets the pipeline carbon dioxide requirement. The process conditions in vessel 103 are located on FIG. 1. as point B. Point B shows that gas at minus 140 degrees F. and 400 psia will contain a maximum of about 1.1% carbon dioxide. The leaving product vapor stream can be warmed in heat exchange with the incoming feed stream.

The carbon dioxide particles are more dense than the liquid contained in removal zone 105. The particles fall through liquid in zone 105 until they make contact with liquid in the lower portion of zone 105 which is warmer than the melting point of the solids. The carbon dioxide solids melt in the liquid in the lower portion of zone 105. The liquid in the lower portion of zone 105 is carbon dioxide rich. The carbon dioxide rich liquid is withdrawn from vessel 103 via line 12 and valve 107. Hydrocarbon rich liquid is withdrawn via line 13 and valve 108. The temperature of the lower part of zone 105 is maintained at about −65 degrees F. which is warmer than the melting point of the carbon dioxide solids. Heat for maintaining the temperature is provided by one or more of heat exchanger 106. Valve 107 would generally be controlled by the composition of the liquid in the lower part of zone 105. Valve 108 would generally be controlled by zone 105 liquid level.

Start-up is accomplished by routing the feed stream through line 10 into vessel 103. The flow exits via line 11. The gas in line 11 is vented, flared, or recycled until product purity is obtained. The system is cooled down by operating in this start-up flow mode. If necessary additional fluids can be added to establish the vessel liquid level. After operating temperatures are obtained, a proper liquid level is established, and product purity is obtained, the operation can be switched from the start-up flow mode to the normal operating mode.

What is claimed is:

1. A process for separating carbon dioxide and additional components from a multi-component precooled feed stream comprising the following steps:

(a) directing said feed stream into a solids formation zone;

(b) forming solids containing carbon dioxide in the presence of vapor and liquid within a confined stream device in said solids formation zone;

(c) introducing to a vapor disengaging zone, vapor, said solids containing carbon dioxide, and a liquid from said solids formation zone;

(d) separating a product vapor stream from said solids containing carbon dioxide and said liquid in said vapor disengaging zone;

(e) removing said product vapor stream from said vapor disengaging zone;

(f) collecting said solids containing carbon dioxide and said liquid in a removal zone;

(g) providing a separation by density in said removal zone as the higher density said solids containing carbon dioxide fall within the collected said liquid;

(h) providing a temperature gradient as the collected said solids containing carbon dioxide fall within the collected said liquid in said removal zone;

(i) melting at least a portion of collected said solids containing carbon dioxide in said removal zone; and (j) withdrawing at least one stream containing a portion of liquid carbon dioxide from said removal zone.

2. A process in accordance with claim 1 wherein the said solids containing carbon dioxide are melted at a pressure greater than the triple point pressure of the said solids containing carbon dioxide.

3. A process in accordance with claim 1 wherein a temperature gradient separates the coldest process separation temperature and the temperature of the melted liquid for increased energy efficiency.

4. A process in accordance with claim 1 wherein the composition of said solids containing carbon dioxide and said liquid may vary within the process.

5. A process in accordance with claim 1 wherein the separation components can include hydrocarbons, carbon dioxide, and other solid forming components.

6. A process in accordance with claim 1 wherein the confined stream device consists of elbows arranged in series.

7. A process in accordance with claim 1 wherein the confined stream device is a static mixer.

* * * * *